J. H. BANINGER.
HUB FOR VEHICLE WHEELS.
APPLICATION FILED JUNE 15, 1914.
1,173,638.
Patented Feb. 29, 1916.
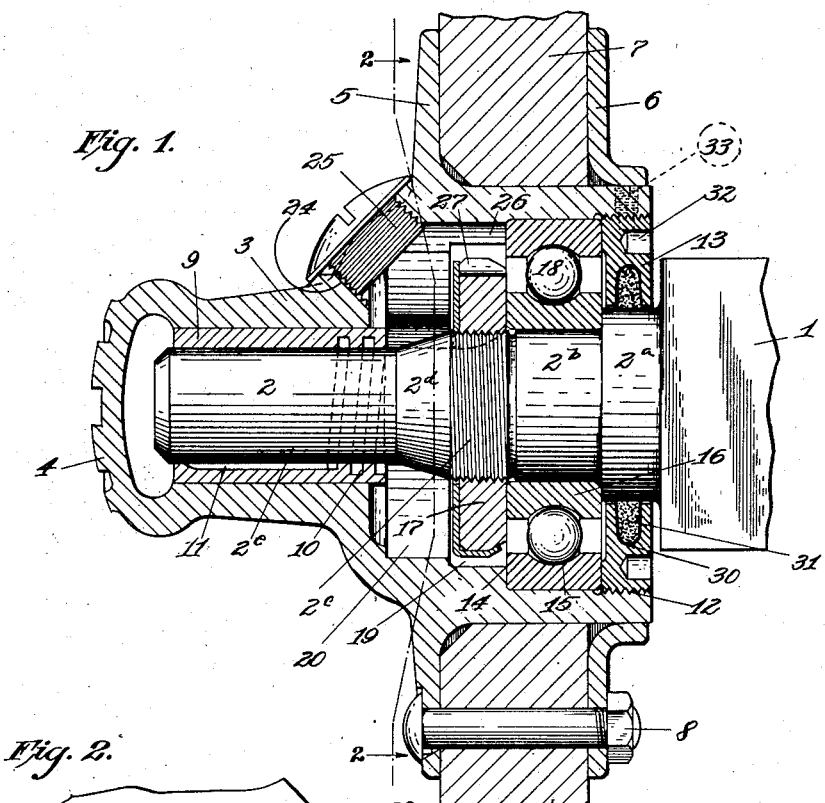
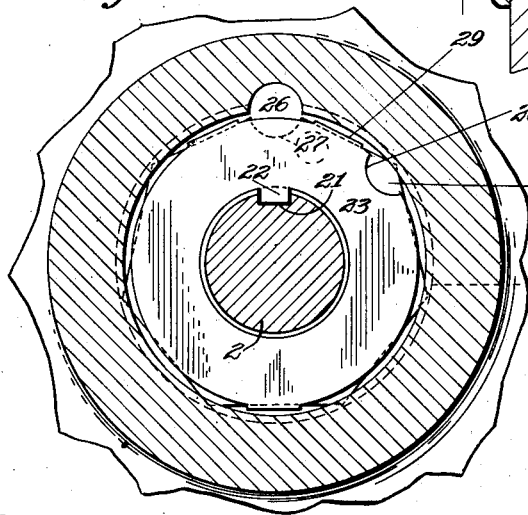
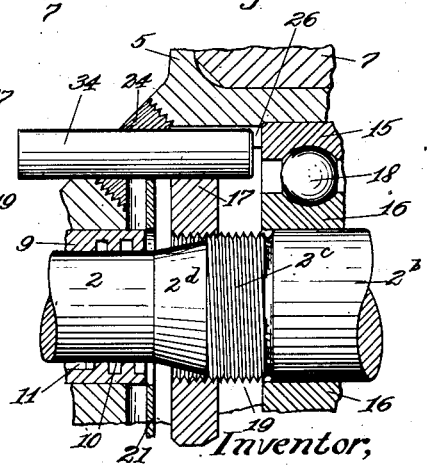
Witnesses:
R. L. Bruck.
H. B. McGill.
Inventor;
John H. Baninger,
By Hull and Smith
Atty's.

UNITED STATES PATENT OFFICE.

JOHN H. BANINGER, OF DETROIT, MICHIGAN.

HUB FOR VEHICLE-WHEELS.

1,173,638.  Specification of Letters Patent.  Patented Feb. 29, 1916.

Application filed June 15, 1914. Serial No. 845,065.

*To all whom it may concern:*

Be it known that I, JOHN H. BANINGER, a citizen of the United States, residing at Detroit, in the county of Wayne and State of Michigan, have invented a certain new and useful Improvement in Hubs for Vehicle-Wheels, of which the following is a full, clear, and exact description, reference being had to the accompanying drawings.

This invention relates to improvements in hubs for vehicle wheels, and it has for its object the provision of a hub that comprises, generally, a hollow casing which is closed at its outer end and within which is contained the necessary bearings, a nut for securing the hub to the axle, and a locking means for holding the nut against turning.

The fact that the hub casing is closed at its outer end obviates the need of a removable cap (which would be liable to loosen and become lost), and, in addition to this, it provides a very effective means of retaining a lubricant within the hub, as will be clearly brought out in the following description. Furthermore, the design and construction of my hub renders its application to an axle, a simple and easy operation.

The above and further objects, which will become apparent as this description proceeds, are attained in a construction illustrated in the accompanying drawing wherein—

Figure 1 represents a central, vertical section through the central portion of a wheel that is equipped with my improved hub, and is shown as applied to an axle; Fig. 2 is a section on the line 2—2 of Fig. 1 and looking in the direction of the arrows; and Fig. 3 shows the method of locking the securing nut to the hub during the operation of applying the wheel to the axle.

Taking up a detailed description of the invention by the use of reference characters, 1 represents an axle that has a spindle 2, the latter having the following sections or portions. Adjacent the axle 1, the spindle has a smooth portion $2^a$, beyond which it is reduced in diameter to provide a portion $2^b$ upon which is mounted the inner ring or raceway of a ball-bearing. A threaded portion $2^c$ adjoins the portion $2^b$ and is separated, by a tapered portion $2^d$, from the smooth, outer end $2^e$.

I will state that, for the purpose of description, the end of the hub remote from the axle will be referred to as the outer end.

The hub casing 3 is preferably formed of an integral casting that has a closed outer end 4 upon which may be formed any desirable emblem, name or design. Toward its inner end the hub casing is enlarged; and intermediate its ends it is provided with an annular flange 5, between which and a removable ring 6 are clamped the inner ends of the spokes 7; the ring 6 and the spokes 7 being secured to the flange 5 by suitable bolts 8.

The outer end of the hub casing is reamed out for the reception of a bushing 9 (which is preferably of bronze), and the internal wall of this bushing, near its inner end, is provided with a spiral groove 10 that communicates, at its outer end, with a longitudinal channel 11 that extends substantially throughout the remainder of the length of said bushing. The inner end of the hub casing 3 is internally threaded at 12 for coöperation with the threaded periphery of a ring 13, and between the inner face of this ring and a shoulder 14, that is formed on the interior wall of the casing, there is clamped the outer ring or raceway 15 of the ball bearing previously mentioned.

The inner raceway 16 of the ball bearing is firmly clamped between the outer end of the section $2^a$ of the spindle, and a nut 17, that is threaded upon the portion $2^c$ of the spindle. The balls of the bearing are indicated at 18. It will be observed from Fig. 1 that a compartment 19 is provided for the nut 17. A chamber 20 adjoins the compartment 19, and is of a lesser diameter than the cross dimension of the nut 17 between substantially diagonally opposite corners. 21 represents a lock washer that is made of resilient material, preferably spring steel, and it has a tongue 22 that normally occupies a keyway 23 that extends through the tapered portion $2^d$ and the threaded portion $2^c$ of the spindle 2. Access may be gained to the interior of the chamber 20 through an opening 24 that is normally closed by a screw plug 25. Adjacent the opening 24, the inner wall of the enlarged end of the hub casing is provided with a substantially semi-cylindrical recess 26 and a similar recess 27 is formed in the periphery of the nut 17. The edge of the lock washer 21 is notched in a similar manner at 28. A plurality of spring fingers 29 extend from the edge of the lock washer 21 at right angles to its body portion, and the ends of these fingers are inclined inwardly to correspond to the inclination of the beveled inner end of the nut 17. It will be observed that the opposite end of the nut 17 is also tapered for a purpose that will become apparent later on.

The inner face of the ring 13 is grooved, as shown at 30, and this groove contains packing material 31 which bears firmly against the smooth portion 2ª of the spindle to form a dust ring that effectually excludes dust from the interior of the casing 3. The ring 13 has sockets 32 for the application of a spanner wrench whereby it may be firmly screwed up against the outer raceway 15 of the ball bearing; and the ring may be locked in such position by a radial set screw 33 that is threaded through the inner end of the casing 3, as shown in dotted lines in Fig. 1.

I will now give a description of the manner of assembling my hub, and follow it with an explanation of its action. Assuming that the parts are entirely separated (with the exception of the spokes and the parts that secure them to the flange 5), the bushing 9 is first inserted into the outer end of the hub. The lock washer 21 is then dropped into the chamber 20, and the nut 17 is placed within the compartment 19. The ball bearing is then set in against the shoulder 14, and secured there by the ring 13 which is then screwed into the inner end of the casing 3 where it is held by the set screw 33.

With the parts thus assembled, the hub may be placed over the end of the spindle 2, and when the nut 17 engages and rides along the tapered portion 2ᵈ of the spindle, it will be centralized with respect to the threaded portion 2ᶜ. At this point in the operation, a locking pin 34, having substantially the diameter of the recess 26, is inserted through the opening 24 into said recess and into the recess 27 of the nut, and the notch 28 of the washer 21 (as shown in Fig. 3) the parts having been turned so that the recesses and notch are in alinement prior to the insertion of the pin. Now, by spinning the wheel in an appropriate direction, the nut will be screwed onto the threaded portion 2ᶜ of the spindle and be firmly set up against the inner raceway 16 of the ball bearing. The locking pin 34 is then removed, and the spring washer is turned around until its tongue 22 is in register with the keyway 23 in the tapered portion of the spindle. The lock washer may now be forced toward the nut 17. As the inner ends of the fingers 29 engage the tapered portion of the nut 17 they rise and ride over its adjacent faces until their inner ends spring down into contact with the inner beveled end of said nut. In this manner the nut is securely locked to the spindle through the washer 21. Before the opening 24 is closed by the plug 25, a lubricant may be introduced into the interior of the hub. When the wheel rotates the lubricant will be fed along the spiral groove 10 of the bushing 9, to the channel 11, and thus very effectively lubricate the portion 2ᵉ of the spindle. At the same time the lubricant will find its way to all other parts of the hub.

From the foregoing it will be seen that my invention provides a hub that is very substantial; that can be very easily and quickly applied to the spindle of an axle; that may be firmly locked to such spindle, that may be effectively lubricated, and that is compartively cheap of manufacture.

Having thus described my invention what I claim is:—

1. A hub for vehicle wheels comprising, in combination, a hollow casing that is closed at its outer end and having a flange intermediate its ends to which the spokes of a wheel may be attached, a bushing within the outer end of the casing, a ball bearing within the casing adjacent its inner end, a nut intermediate the bushing and the bearing, and a spindle having a portion for insertion into the aforesaid bushing, a portion whereon the ball bearing is mounted and a threaded portion for the reception of the aforesaid nut.

2. A hub for vehicle wheels comprising, in combination, a hollow casing that is closed at its outer end and having a flange intermediate its ends to which the spokes of a wheel may be attached, a bushing within the outer end of the casing, a ball bearing within the casing adjacent its inner end, a nut intermediate the bushing and the bearing, a spindle having a portion for insertion into the aforesaid bushing, a portion whereon the ball bearing is mounted, and a threaded portion for the reception of the aforesaid nut, and means for locking said nut against rotation with respect to the spindle.

3. A hub for vehicle wheels comprising, in combination, a hollow casing that is closed at its outer end and open at its inner end, and having a flange intermediate said ends to which may be attached the spokes of a wheel, a bushing within the outer end of the casing, a ball bearing within the casing adjacent its inner end, a spindle having a portion for insertion into said bushing and a portion whereon the ball bearing is mounted, the spindle being threaded intermediate said portions, a nut for application to the threaded portion, and means whereby the nut and the casing may be temporarily locked together so that the turning of the casing will rotate the nut.

4. A hub for vehicle wheels comprising, in combination, a hollow casing that is closed at its outer end and open at its inner end and having a flange intermediate said ends to which may be attached the spokes of a wheel, a bushing within the outer end of the casing, a ball bearing within the casing adjacent its inner end, means for retaining the outer raceway of the ball bearing in position, a spindle having a portion for insertion into said bushing and a portion whereon the ball bearing is mounted, the spindle being threaded intermediate said portions, a nut for application to the threaded portion, the nut and the casing having recesses that are adapted to be brought into register for the reception of a locking pin, whereby the turning of the casing may effect the screwing of the nut upon the threaded portion, and means for locking the nut against rotation with respect to the spindle after the same has been threaded thereon.

5. A hub for vehicle wheels comprising, in combination, a hollow casing that is closed at its outer end and open at its inner end, and having an internal shoulder that is spaced from its open end, a bushing within the outer end of the hub, a ball bearing within the hub adjacent its inner end, means for clamping the outer raceway of the ball bearing against the aforesaid shoulder, a spindle that projects into the hub and having a smooth portion that has a bearing in the aforesaid bushing and a portion whereon the ball bearing is mounted, the spindle being threaded adjacent the last mentioned portion and tapered between the threaded portion and the first mentioned portion, and a nut for application to the threaded portion of the spindle.

6. A hub for vehicle wheels comprising, in combination, a hollow casing the outer end of which is closed, a bushing within the outer end of the casing, a ball bearing within the casing adjacent its inner end, a spindle having a portion that bears within the bushing, another portion whereon the ball bearing is mounted, and a threaded portion adjacent the last mentioned portion, a nut for application to said threaded portion, the inner wall of the casing and the periphery of the nut having recesses that are adapted to be brought into register for the reception of a locking pin whereby said parts may be temporarily held against relative turning, the casing also having an opening through which a pin may be inserted into said recesses, and a closure for said opening.

7. A hub for vehicle wheels comprising, in combination, a hollow casing that is closed at its outer end and open at its inner end, and having an internal shoulder that is spaced from its open end, a bushing within the outer end of the casing, a ball bearing within the hub adjacent its inner end, means for clamping the outer raceway of the ball bearing against the aforesaid shoulder, a spindle that projects into the hub and having a smooth portion bearing within the aforesaid bushing and a portion whereon the ball bearing is mounted, the spindle being threaded adjacent the last mentioned portion and tapered between the threaded portion and the first mentioned portion, the tapered portion having a keyway, a nut for application to the threaded portion of the spindle, a locking washer that has fingers which embrace the periphery of the nut and a tongue which is adapted to be received by the keyway of the spindle, the inner wall of the casing having a recess, the periphery of the nut and the edge of the lock washer having recesses which are arranged to be brought into register with the recess of the casing for the reception of a locking pin for temporarily locking the nut and the casing together, the casing having an opening through which a pin may be inserted into said recesses, and a plug for closing said opening.

8. A hub for vehicle wheels comprising, in combination, a hollow casing the outer end of which is closed, a bushing within the outer end of the casing, a ball bearing within the casing adjacent its inner end, the casing having a shoulder against which one edge of the bearing abuts, means for holding the bearing against the shoulder, a compartment in juxtaposition to the shoulder, a nut within said compartment, the casing also being provided with a chamber adjacent said compartment for the reception of a lock washer, the chamber being of a lesser diameter than the cross dimension of the nut, a spindle having a portion that bears within the bushing, another portion whereon the ball bearing is mounted and a threaded portion adjacent the last mentioned portion, the spindle having a keyway, a nut for application to said threaded portion which nut is contained within the compartment of the hub, a lock washer within the chamber of the hub that has fingers for engaging the periphery of the nut and a tongue that is adapted to be received by the keyway in the spindle, the inner wall of the casing, the periphery of the nut and the edge of the lock washer having recesses that are adapted to be brought into register for the reception of a locking pin, whereby said parts may be temporarily held against relative turning, the casing also having an opening through which a pin may be inserted into said recesses, and a closure for said opening.

9. A hub for vehicle wheels comprising, in combination, a hollow casing that has a closed end, a bushing within the outer end of the casing, a ball bearing within the casing adjacent its inner end, a spindle that projects into the casing and having a smooth portion that has a bearing in the aforesaid bushing, a portion whereon the ball bearing is mounted, and a threaded portion adjacent thereto, a nut for application to the threaded portion of the spindle, the spindle having a keyway adjacent its threaded portion, a lock washer having a tongue that occupies the keway and spring fingers which embrace the periphery of the nut, the interior of the casing and the periphery of the nut having recesses and the edge of the lock washer having a notch, all of which are adapted to be brought into register for the reception of a locking pin, the arrangement being such that the notch within the lock washer cannot register with the recess in the casing when its tongue is within the keway of the spindle, the casing having an opening through which a pin may be inserted in to the aforesaid recesses and notch, and a closure for said opening.

10. A hub for vehicle wheels comprising, in combination, a hollow casing that has a closed outer end and an enlarged open inner end that is internally threaded, the casing having a lateral flange intermediate of its ends, a ring for application to the inner end of the hub between which and the aforesaid flange is adapted to be secured the inner end of the spokes of a wheel, a bushing within the outer end of the casing, a ball bearing within the casing adjacent its inner end, the casing having a shoulder against which said bearing abuts, a threaded ring that coöperates with the internally threaded inner end of the casing and which acts to hold the ball bearing against the aforesaid shoulder, the inner edge of the ring having a channel, a packing member contained within the channel, a spindle that projects into the casing and having a smooth portion that bears within the aforesaid bushing and a similar portion whereon the ball bearing is mounted, the spindle having a smooth portion that is engaged by the packing member and is located to one side of the ball bearing and a threaded portion that is located on the opposite side thereof, said spindle tapering from the threaded portion toward its outer end, the interior of the casing having a compartment that surrounds the threaded portion of the spindle and a chamber that surrounds the tapered portion thereof, a nut for application to the threaded portion of the spindle, the spindle having a keyway in its tapered portion, a lock washer having a tongue that occupies the keyway and spring fingers which embrace the periphery of the nut, the interior of the casing and the periphery of the nut having recesses and the edge of the lock washer having a notch, all of which are adapted to be brought into register for the reception of a locking pin, the arrangement being such that the notch of the lock washer cannot register with the recess in the casing when its tongue is within the keyway of the spindle, the casing having an opening through which a pin may be inserted into the aforesaid recesses and notch, and a closure for said opening.

11. A hub for vehicle wheels comprising, in combination, a hollow casing that is closed at its outer end, a bearing within the outer end of the casing, a second bearing within the casing adjacent its inner end, a spindle that is journaled within the bearing and having a threaded portion intermediate thereof, a nut for application to the threaded portion of the spindle, means for locking the nut against movement with respect to the spindle, and further means for temporarily locking the nut to the casing, the arrangement being such as will allow only one of said means to be effective at a time.

12. A hub for vehicle wheels comprising, in combination, a hollow casing that is closed at its outer end, a bearing within the casing, a spindle that is journaled within the bearing and having a threaded portion intermediate said bearing and the outer end of the hub, a nut for application to the threaded portion of the spindle, means for locking the nut against movement with respect to the spindle, and further means for temporarily locking the nut to the casing, the arrangement being such as will allow only one of said means to be effective at a time.

13. A hub for vehicle wheels comprising, in combination, a hollow casing that is permanently closed at its outer end, a bushing-bearing within one end of the casing, a rolling-bearing within the other end of the casing, and means for holding the casing on an inclosed spindle.

14. A hub for vehicle wheels comprising, in combination, a hollow casing, a bushing-bearing within one end of the casing, a rolling-bearing within the other end of the casing, and means intermediate said bearings for holding the casing on an inclosed spindle.

In testimony whereof I hereunto affix my signature in the presence of two witnesses.

JOHN H. BANINGER.

Witnesses:
M. M. MULL,
M. E. CLEW.